US011976842B2

(12) United States Patent
Sinur et al.

(10) Patent No.: US 11,976,842 B2
(45) **Date of Patent: *May 7, 2024**

(54) COMBINED VENTILATION AND ILLUMINATION SYSTEM

(71) Applicant: Broan-NuTone LLC, Hartford, WI (US)

(72) Inventors: Richard R. Sinur, Hartford, WI (US); Ryan A. Revers, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 435 days.

This patent is subject to a terminal disclaimer.

(21) Appl. No.: 17/479,368

(22) Filed: Sep. 20, 2021

(65) Prior Publication Data

US 2022/0003451 A1 Jan. 6, 2022

Related U.S. Application Data

(63) Continuation of application No. 16/189,327, filed on Nov. 13, 2018, now Pat. No. 11,143,432.

(60) Provisional application No. 62/585,998, filed on Nov. 14, 2017.

(51) Int. Cl.

| | |
|---|---|
| ***F24F 13/078*** | (2006.01) |
| ***F21S 8/04*** | (2006.01) |
| ***F21S 8/06*** | (2006.01) |
| ***F21V 33/00*** | (2006.01) |

(52) U.S. Cl.

CPC ............ *F24F 13/078* (2013.01); *F21S 8/043* (2013.01); *F21S 8/06* (2013.01); *F21V 33/0096* (2013.01); *F24F 2221/02* (2013.01)

(58) Field of Classification Search

CPC ...... F24F 13/078; F24F 2221/02; F21S 8/043; F21S 8/06; F21V 33/0096

USPC .......................................................... 454/294

See application file for complete search history.

(56) References Cited

U.S. PATENT DOCUMENTS

| | | | |
|---|---|---|---|
| 3,068,341 | A | 12/1962 | Ortiz et al. |
| 8,961,126 | B1 | 2/2015 | Tom |
| 9,416,989 | B1 | 8/2016 | Tom |
| 11,143,432 | B2 | 10/2021 | Sinur et al. |
| 2008/0062643 | A1 | 3/2008 | Mehta |
| 2009/0073702 | A1 | 3/2009 | Craw et al. |
| 2010/0095950 | A1 | 4/2010 | Negandhi et al. |
| 2014/0112781 | A1 | 4/2014 | Yang et al. |

(Continued)

OTHER PUBLICATIONS

International Search Report and Written Opinion issued to PCT/US18/60740 dated Jan. 11, 2019 (12 pages).

*Primary Examiner* — Allen R. B. Schult

(74) *Attorney, Agent, or Firm* — Barnes & Thornburg LLP

(57) ABSTRACT

A combined ventilation and illumination system includes a ventilation assembly, a light fixture assembly, and a connector assembly. In an installed position, the system is installed above a ceiling of a room of building structure (e.g., a residence or workplace) to provide ventilation for the room. The system couples a light fixture to ventilation assembly below the ceiling. In the installed position, an air flow cavity is defined between the light fixture and the ceiling, where the cavity allows for air flow around the light fixture and into the ventilation assembly for eventual exhaust beyond the room in which the system is installed. The cavity includes a first critical distance that is sized according to operating parameters of a blower of the ventilation assembly to provide an adequate flow rate of intake air and to provide acceptable sound levels during operation of the system.

23 Claims, 11 Drawing Sheets

(56) References Cited

U.S. PATENT DOCUMENTS

| | | | |
|---|---|---|---|
| 2016/0054015 | A1 | 2/2016 | Tom |
| 2016/0209049 | A1 | 7/2016 | Limberg et al. |
| 2018/0080645 | A1 | 3/2018 | Tsai et al. |
| 2018/0119934 | A1 | 5/2018 | Schneider |

COMBINED VENTILATION AND ILLUMINATION SYSTEM

PRIORITY

This Application claims priority under 35 U.S.C. § 119(e) to U.S. U.S. Utility Application Ser. No. 16/189,327, filed Nov. 13, 2018, which claims benefit to Provisional Application Ser. No. 62/585,998, filed Nov. 14, 2017, which is expressly incorporated by reference herein and made a part hereof.

TECHNICAL FIELD

The present disclosure relates generally to a combined ventilation and illumination system that is installed above a ceiling of a room and that couples with a light fixture. In an installed position, an air flow cavity is defined between the light fixture and the ceiling to which the system is installed, where the cavity allows for air flow around the light fixture, through a baffle positioned within a ceiling aperture, and into an internal region of the system for eventual exhaust.

BACKGROUND

Conventional ventilation exhaust fans, such as those typically installed in a room of a building structure, such as a bathroom, draw air from within an area of the room, through the fan and exhaust the air to another location, such as through a vent in the gable or roof of a home or other building structure. Many conventional ventilation exhaust fan assemblies include a housing positioned within or adjacent an aperture formed in a wall or ceiling. Some conventional exhaust fans also include a lighting element, such as a light bulb operably connected within a socket in the housing to provide illumination within the room. However, the light bulb is visible to observers standing within the room. A shroud may be positioned with the housing to substantially or entirely obscure the socket. In some cases, it may be desirable to replace the light bulb with a more aesthetically pleasing light fixture while still providing the ventilation function of the fan. It also may be desirable to replace the single light bulb with a light fixture that provides a greater amount of illumination, e.g., more lumens, than that provided by the light bulb, while still providing the ventilation function of the fan.

Therefore, a need exists for a combined ventilation and illumination system that accommodates installation of a light fixture and provides a sufficient amount of ventilation for the room of the building structure. A full discussion of the features and advantages of the present invention is deferred to the following detailed description, which proceeds with reference to the accompanying drawings.

The description provided in the background section should not be assumed to be prior art merely because it is mentioned in or associated with the background section. The background section may include information that describes one or more aspects of the subject technology.

SUMMARY

The present disclosure relates to a combined ventilation and illumination system installable within a ceiling of a room of a building structure. The ventilation and illumination system generally comprises a ventilation assembly, a light fixture assembly, and a connector assembly that operably connects the light fixture assembly to the ventilation assembly. The ventilation assembly includes (i) a main housing with an external wall arrangement defining an internal region, (ii) an inlet opening formed in an external wall that is aligned with an aperture formed in the ceiling, (iii) an outlet opening formed in an external wall and configured to exhaust air from the main housing, and (iv) a blower assembly residing within the internal region and configured to generate air flow through the inlet opening and into the main housing. The light fixture assembly includes a fixture or housing and at least one lighting element. The connector assembly includes (i) a mounting bracket secured to the main housing and cooperatively aligned with the inlet opening, (ii) an elongated coupler extending from the mounting bracket through the inlet opening, (iii) a baffle positioned within the inlet opening and receiving an extent of the elongated coupler, (iv) a junction connector assembly affixed to a lower end portion of the elongated coupler, (v) a retaining element adjustably secured to the junction connector and the lower end portion of the elongated coupler, and (vi) a canopy coupled to both the junction connector and the light fixture assembly to define an installed position. A plurality of wire leads extend from a power source through the elongated coupler to the light fixture assembly to supply power to the lighting element for operation in the installed position.

In some implementations, the baffle has at least one opening that allows for the passage of air through the baffle, the aperture formed in the support surface (e.g., ceiling) and the inlet opening of the main housing of the ventilation assembly. In an installed position that allows for usage of the system, the canopy is offset a first critical distance from a lower extent of the baffle to define an air flow cavity that allows for air flow around the canopy, through the baffle and into the internal region of the main housing. Also in the installed position, the canopy is offset a second critical distance from a lower surface of the ceiling to further define the air flow cavity that allows for air flow around the canopy, through the baffle and into the internal region of the main housing. During the installation process, the installer of the system adjusts the connector assembly to couple the various components of the system, including the connection of the canopy and the junction connector relative to the baffle, to arrive at the air flow cavity.

Other features and advantages of the invention will be apparent from the following specification taken in conjunction with the following drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
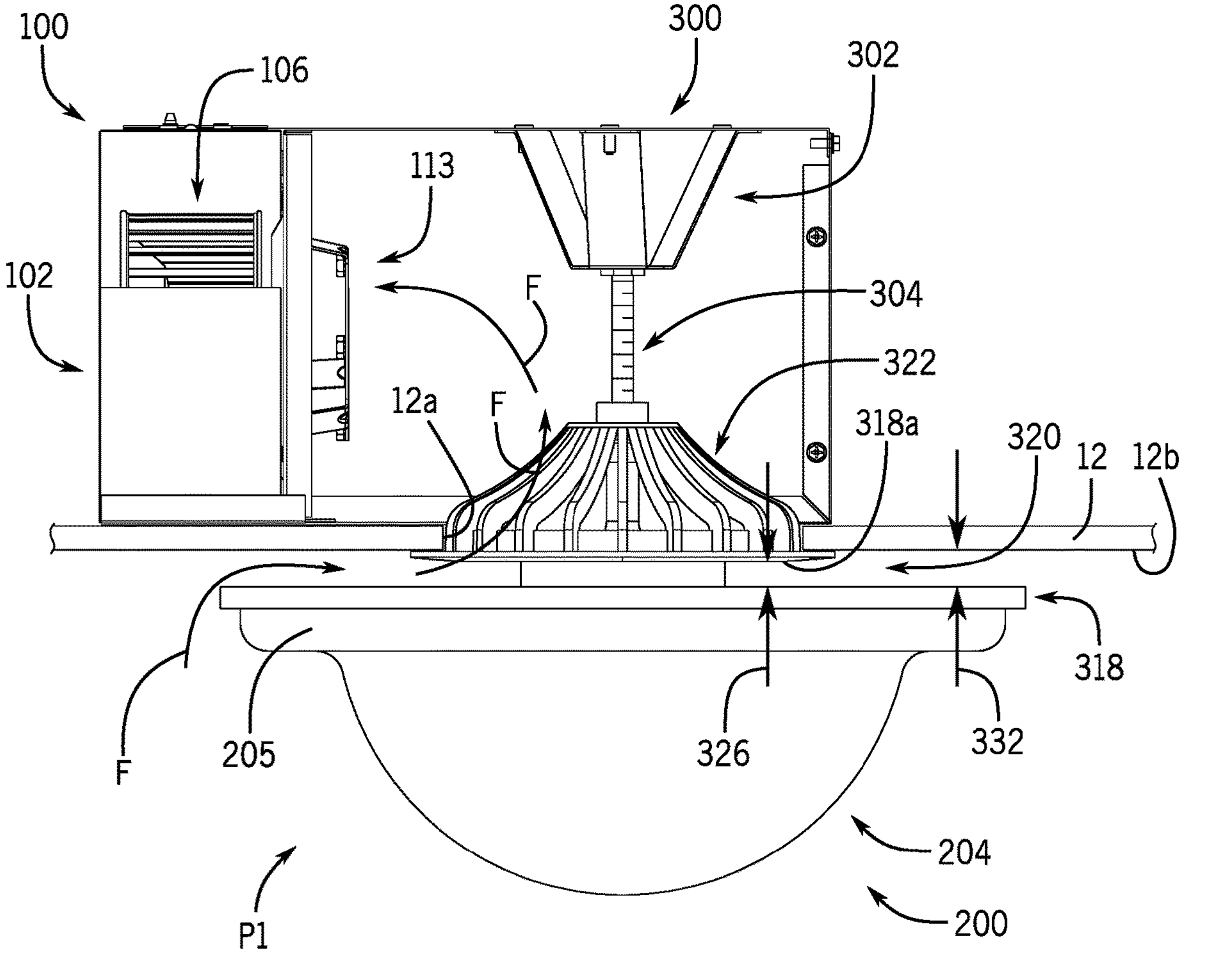
FIG. 1 is a side view of an exemplary embodiment of a combined ventilation and illumination system in accordance with the present disclosure in an installed position, where the system includes a ventilation assembly, a connector assembly and light fixture assembly, and showing air flow F through the system.
Figure 2:
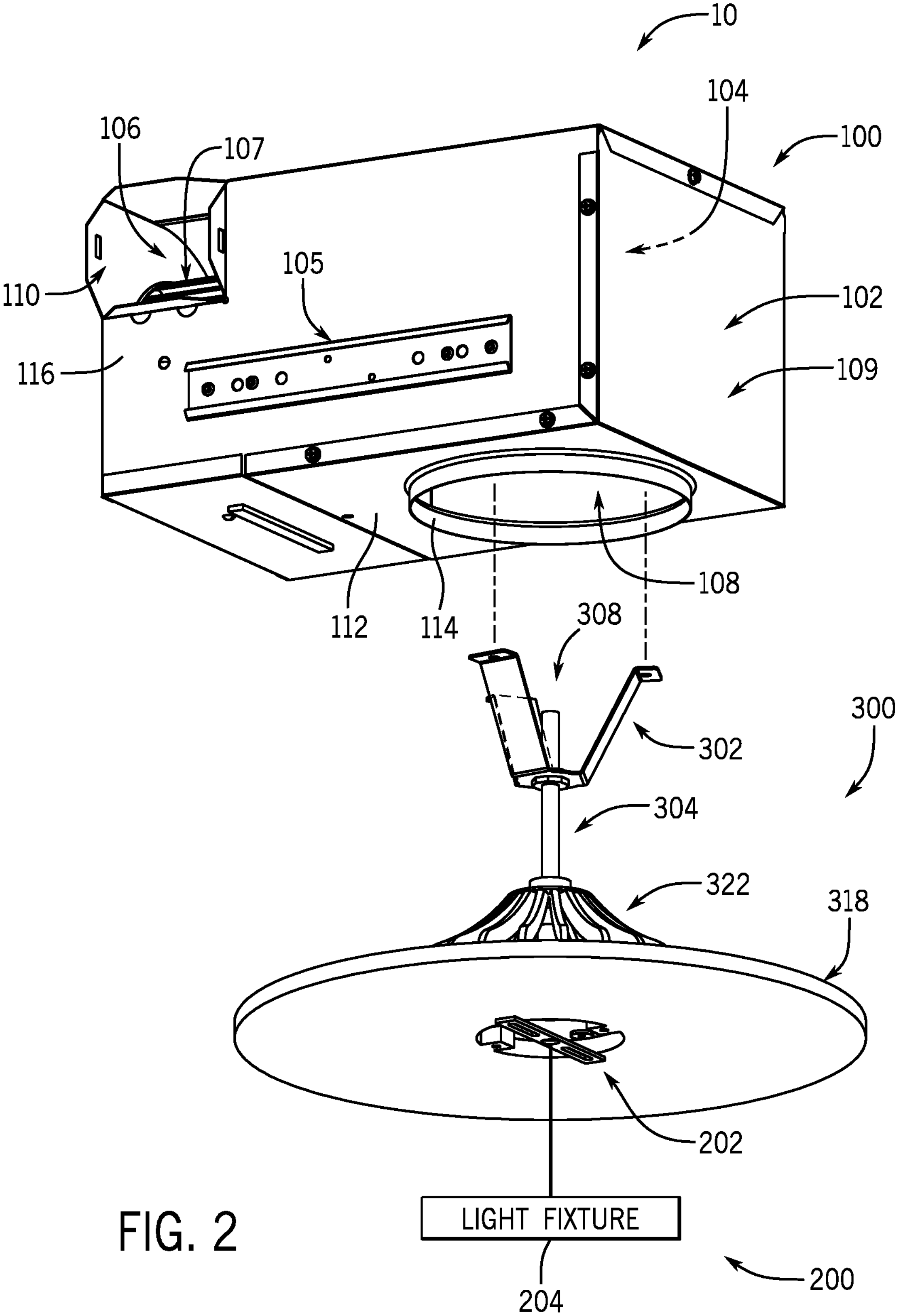
FIG. 2 is a perspective view of the connector assembly detached from the ventilation assembly of the ventilation and illumination system.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Referring to FIGS. 1-14, a ventilation and illumination system constructed in accordance with an exemplary embodiment of the present invention is shown generally at 10. The ventilation and illumination system 10 comprises several components and devices which perform various functions, as described below. The ventilation and illumination system 10 includes a ventilation assembly 100, a light fixture assembly 200, and a connector assembly 300. In an installed position P1 of FIGS. 1, 13 and 14, the combined ventilation and illumination system 10 is installed above a ceiling 12 of a room of building structure (e.g., a residence or workplace) and couples with a light fixture 204, 1204 to secure it below the ceiling 12. In the installed position P1, an air flow cavity 320 is defined between the light fixture 204 and the ceiling 12, where the cavity 320 allows for air flow F (see FIG. 1) around the light fixture 204 and into the ventilation assembly 100 for eventual exhaust beyond the room in which the system 10 is installed. The system 10 can be manufactured, marketed and sold with both the ventilation assembly 100 and the light fixture assembly 200 to provide both ventilation and lighting features. Alternatively, the system 10 is manufactured, marketed and sold with the ventilation assembly 100 but omitting the light fixture assembly 200, however, a separate light fixture assembly can be coupled to the system 10. In this manner, the system 10 functions as a flexible platform to accommodate the installation of many different sized light fixtures sold in the marketplace.

As shown in FIG. 1, the ventilation assembly 100 includes a main housing 102 defining an internal region 104 and a blower assembly 106 residing within the internal region 104. The blower assembly 106 includes a motor 113 and an impeller or wheel 107 operably connected to the motor 113 and residing within an internal scroll. During operation of the blower assembly 106, the impeller 107 rotates about a central axis and draws air from the room into the housing 102. The light fixture assembly 200 includes a light fixture bracket 202 that is configured to couple a light fixture 204 to the system 10, as described below. As such, the connector assembly 300 provides means for connecting the light fixture assembly 200 to the ventilation assembly 100 in the installed positon P1.

Figure 3:
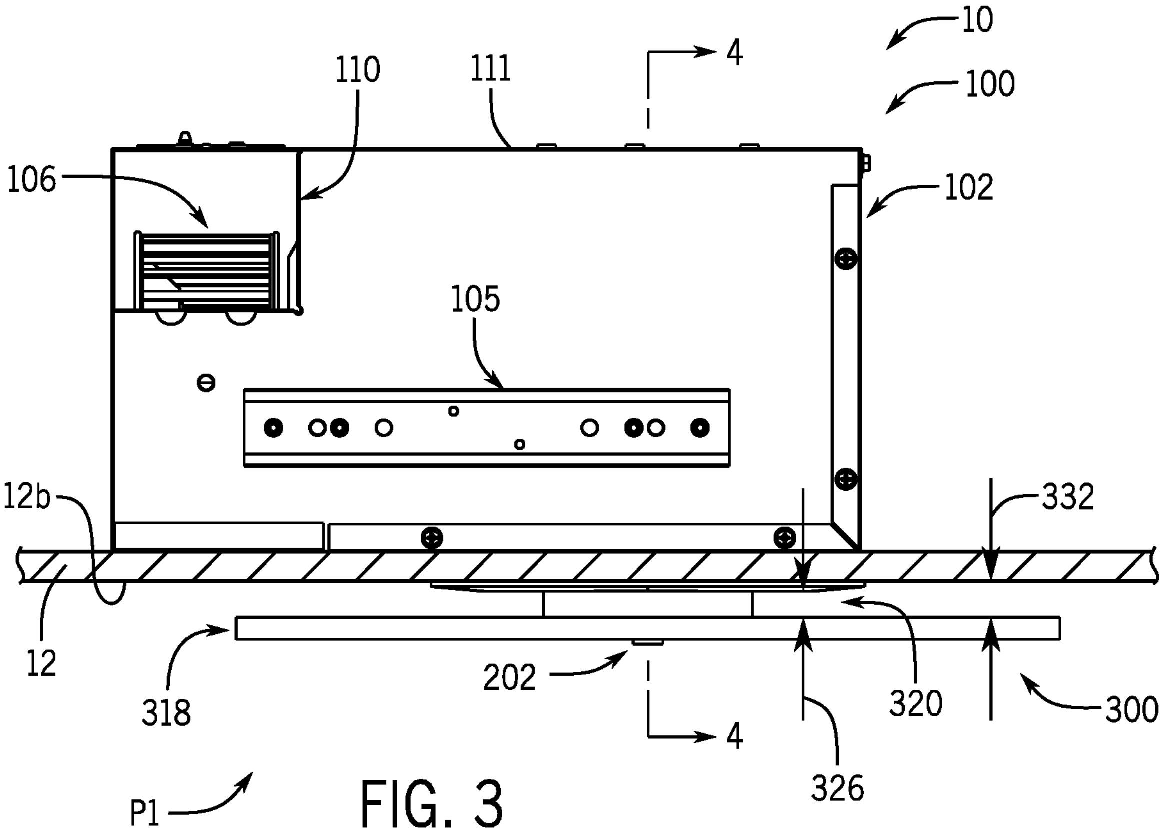
FIG. 3 is a side view of the ventilation and illumination system of FIG. 1 installed above a ceiling in a partially installed state, with arrows indicating both a first critical dimension and a second critical dimension between a canopy of the connector assembly and the ceiling.

Referring to FIGS. 1-4, the main housing 102 includes at least one bracket 105 adapted to secure the ventilation and illumination system 10 to the building structure to position the system 10 relative to a room to be ventilated and/or illuminated. The housing bracket 105 may be shaped and sized to mate with ceiling structure, such as joist or support member of the building structure. The main housing 102 also includes an external wall arrangement 109 comprised of a plurality of housing walls that define the internal region 104 as shown in FIGS. 1 and 3. The internal region 104 houses various components of the system 10 including the blower 106, at least a portion of the connector assembly 300 and one or more electrical connections for the system 10. The main housing 102 also includes an inlet air opening 108 and an outlet or discharge air opening 110. In the embodiment of FIG. 1, the inlet opening 108 is formed in a bottom wall 112 of the external wall arrangement 109 and is cooperatively dimensioned to align with an aperture 12*a* formed in the ceiling 12 of the room of the building structure. A depending flange 114 (see FIG. 2) extends from the bottom wall 112 and into an extent of the ceiling aperture 12*a*. The outlet air opening 110 is formed in a side wall 116 of the external wall arrangement 109 and directs discharge air toward a space outside of the internal region 104. In some embodiments, the outlet opening 110 may be fluidly coupled to a duct leading to a vent that opens into the atmosphere outside of the building structure.

The main housing 102 can be formed of any material known to those skilled in the art capable of withstanding varying temperatures, namely to withstand any heat radiated and/or conducted from the lamp, motor and/or other components while providing structural integrity to the system 10. In some embodiments, the main housing 102 is formed of sheet metal, but could instead be formed of a ceramic or a polymer having a relatively high melting temperature and/or glass transition temperature. The main housing 102 can have any shape, including a box-like or cubical shape, a hemi-spherical shape, a spherical shape, a pyramidal shape, and the like. The main housing 102 can form a base or frame for the ventilation and illumination system 10, thereby providing points and areas of attachment for other components of the ventilation and illumination system 10. As shown in FIGS. 1-4 for example, the main housing 102 can provide places of attachment for various components such as the blower assembly 106 and the connector assembly 300.

In one embodiment, the blower assembly 106 is a centrifugal fan including the motor and the impeller 107, as is well-known to those skilled in the art. However, other types of blower assemblies can be employed as desired provided they do not interfere with the structure and operation of the connector assembly 300. Illustratively, the blower assembly 106 is located entirely within the main housing 102, however in other embodiments, the blower 106 can be in fluid communication with the main housing 102 via one or more ducts coupled to the main housing 102. In yet another embodiment, the internal region may include multiple sub-cavities and the blower 106 may be located in only one of the sub-cavities.

Figure 4:
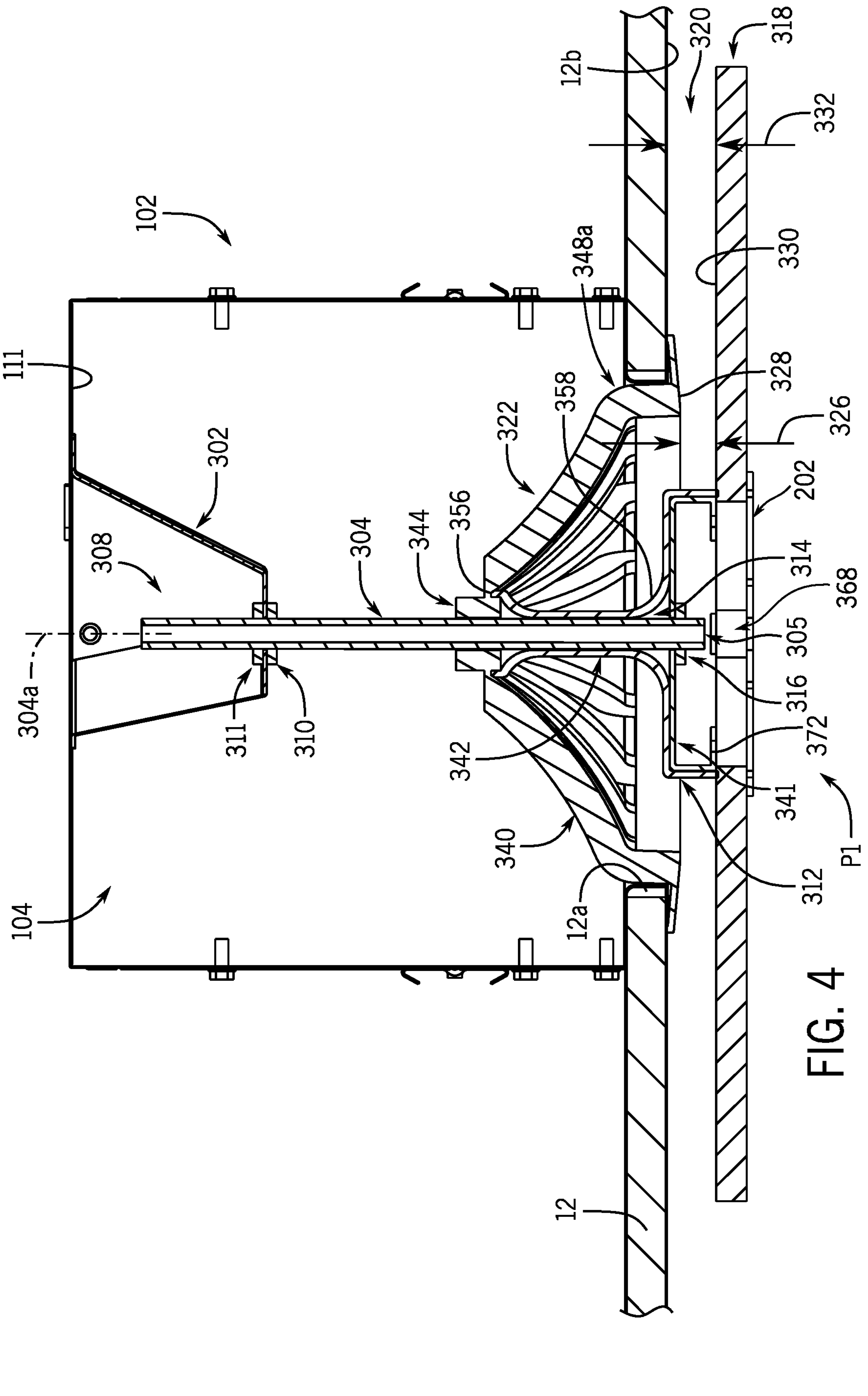
FIG. 4 is a cross-sectional view of the ventilation and illumination system taken along line 4-4 of FIG. 3, showing the system in the partially installed state and with arrows indicating the first and second critical dimensions between the canopy of the connector assembly and the ceiling.
Figure 12:
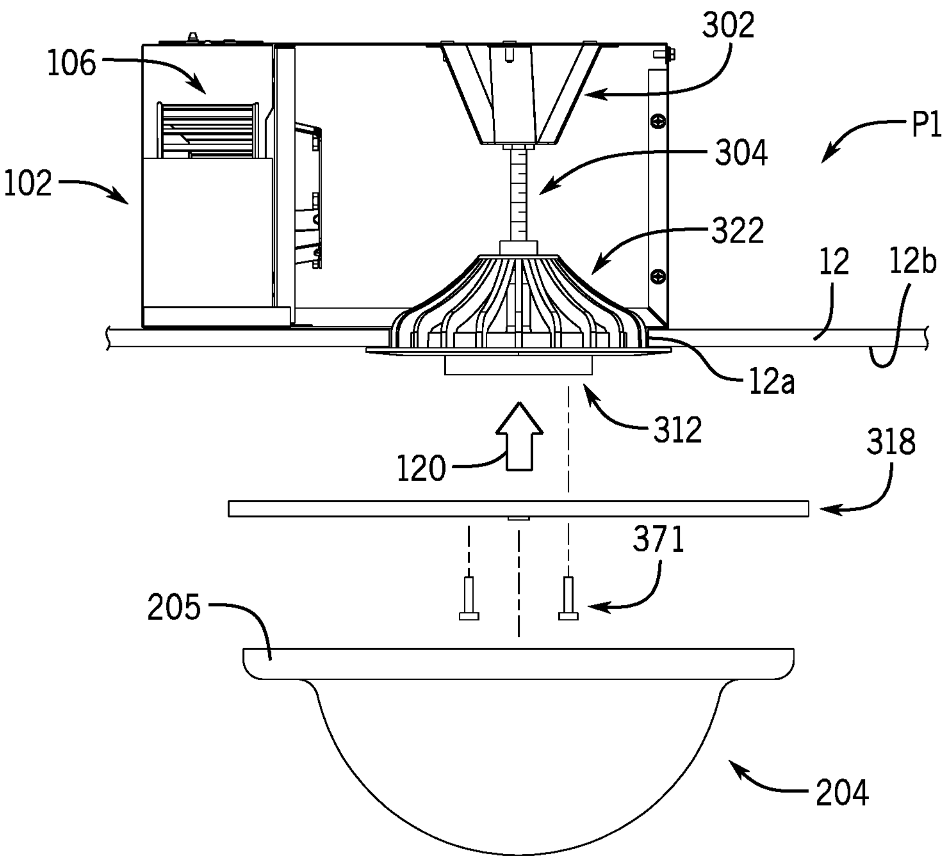
FIG. 12 is a side view of the ventilation and illumination system showing the connector assembly in a third partially installed state, where a light fixture is readied for coupling to a canopy of the connector assembly.

In general terms, the connector assembly 300 operably connects the light fixture assembly 200 to the ventilation assembly 100 as shown in FIGS. 1, 4 and 12 to arrive at the installed position P1. The connector assembly 300 provides means for mounting a wide variety of light fixture assemblies 200, including flush mounted ceiling light fixtures and pendant light fixtures, to the ventilation system 100 to provide the system 10 with both ventilation and illumination functionality. The light fixture assembly 200 and the connector assembly 300 could be provided as original equipment or retrofit for a pre-existing ventilation system. For example, the light fixture assembly 200 and the connector assembly 300 could be provided as a retrofit or replacement assembly for a pre-existing ventilation system that may lack a lighting component. Although this disclosure shows the light fixture assembly 200 and the connector assembly 300 in conjunction with the ventilation assembly 100, namely the main housing 102, the light fixture assembly 200 and the connector assembly 300 may be installed in a ventilation system that lacks a local main housing 102 with a blower 106. For example, the light fixture assembly 200 and the connector assembly 300 could be installed to a duct inlet in a room where the duct is part of a ventilation system (e.g. fresh air system or HVAC system) having a central blower that is located remote from the particular light fixture assembly 200 and the connector assembly 300. This remote central blower also provides for air flow F around the light fixture assembly 200, through the connector assembly 300 and into the duct inlet.

Figure 5:
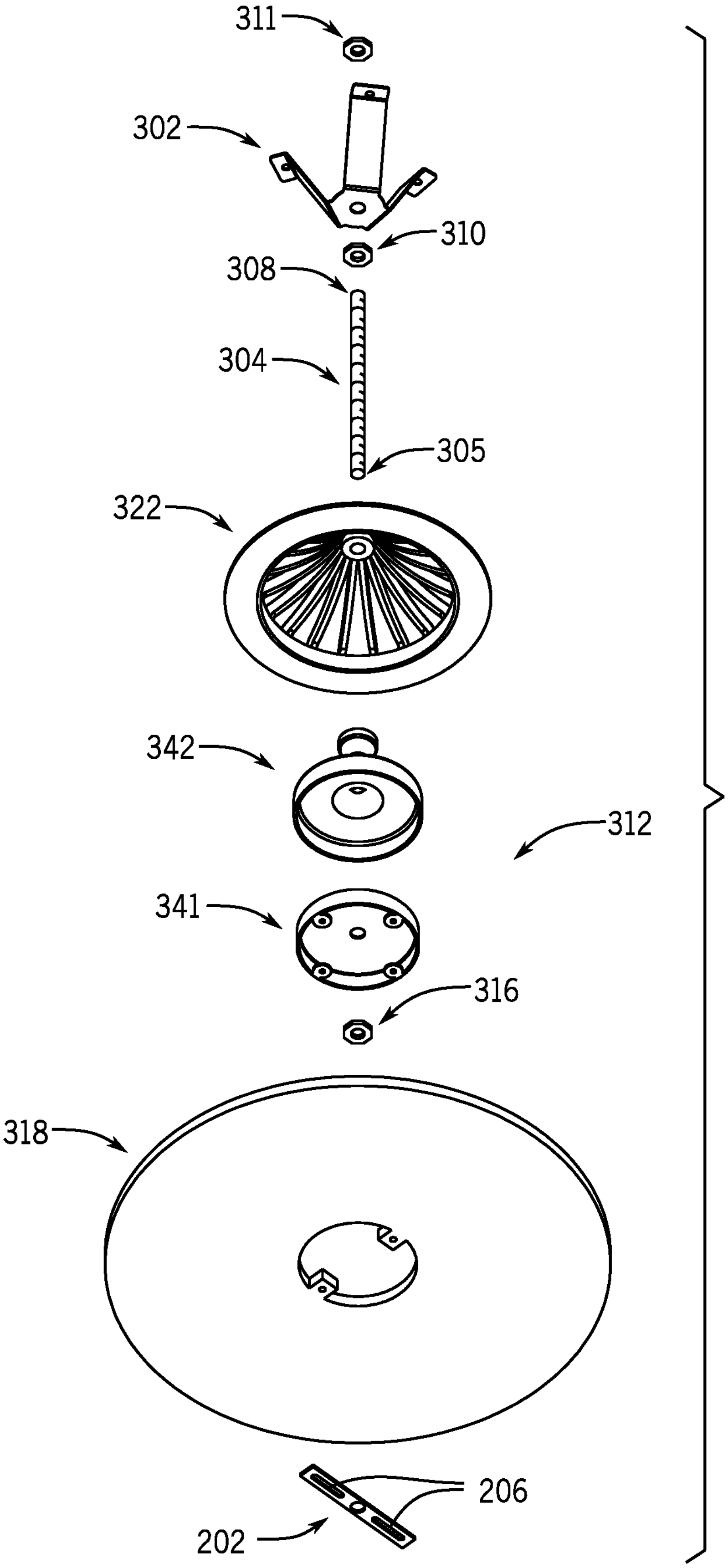
FIG. 5 is an exploded view of the connector assembly of the ventilation and illumination system.
Figure 6:
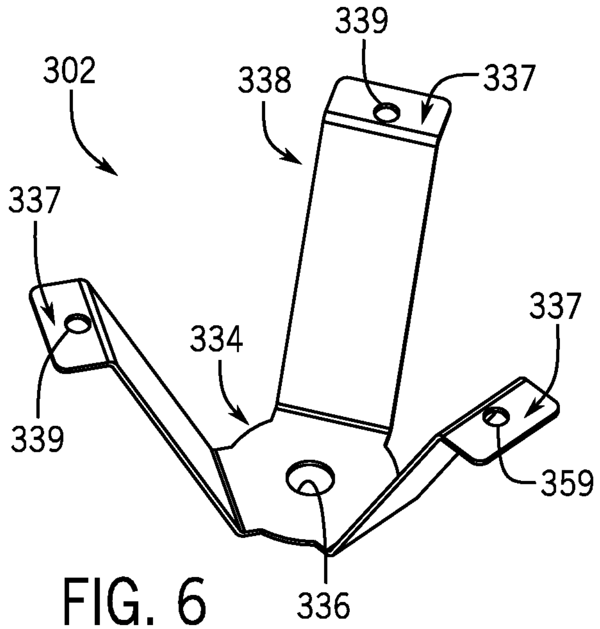
FIG. 6 is a perspective view of a mounting bracket of the connector assembly.

As shown in at least FIGS. 1 and 4-8, the connector assembly 300 includes a mounting bracket 302 and an elongated coupler 304. The mounting bracket 302 is secured to the main housing 102, preferably a top wall 111 of the housing 102, directly above the inlet opening 108 to align the connector assembly 300 and the light fixture assembly 200 with the inlet opening 108 along an axis 304*a*. As shown in FIG. 6, the mounting bracket 302 includes a central hub 334 defining an opening 336 and a plurality of legs 338 extending outwardly from the central hub 334. The opening 336 is arranged to adjustably receive an extent of the elongated coupler 304. In the illustrative embodiment, the plurality of legs 338 includes three legs that cooperate to provide a tripod-style configuration to the mounting bracket 302. Each of the legs 338 is coupled to the top wall 111 to secure the connector assembly 300 to the ventilation assembly 100. Each leg 338 also includes a foot 337 having a mounting aperture 339 that receives a fastener to secure the mounting bracket 302 to the top wall 111. The mounting bracket 302 can be affixed within the main housing 102 by using a plurality of weld studs or fasteners such as screws, bolts, or any other suitable fastener to join the bracket 302 to the top wall 111 of the housing 102. Alternatively, the mounting bracket 302 may be installed in the field or at the site of installation to retrofit an existing ventilation assembly 100 with the connector assembly 300. The connector assembly 300, namely the coupler 304 and the bracket 302 are removable from within the housing 102 to allow for a service technician to access the blower assembly 106 and perform diagnostic and maintenance services on the blower assembly 106, as necessary.

Referring to FIG. 4, an upper extent of the elongated coupler 304 engages with and extends through the mounting bracket 302. The coupler 304 extends downwardly from the mounting bracket 302 towards the inlet opening 108. An intermediate extent of the coupler 304 extends through a baffle 322 of the connector assembly 300. A lower extent 305 of the coupler 304 extends through the inlet opening 108. The elongated coupler 304 is illustratively embodied as a hollow tube having a threaded outer surface 306 to enable adjustment of an upper extent 308 of the coupler 304 relative to the bracket 302. A plurality of wire leads extend from a power source through the elongated coupler 304 to the light fixture assembly 200 to supply power to the light fixture 204. The upper coupler extent 308 is received in an aperture formed in the mounting bracket 302 and threadingly engaged with a retainer 310 to adjustably couple the elongated coupler 304 to the mounting bracket 302. In one embodiment, the retainer 310 includes threads formed integral with the mounting bracket 302. In other embodiments, the retainer 310 may be a separate component such as a nut or another suitable retainer. An additional retainer 311 may be coupled to the elongated coupler 304 opposite the retainer 310 to apply an opposite force on the mounting bracket 302 to increase stability of the elongated coupler 304.

Figure 7:
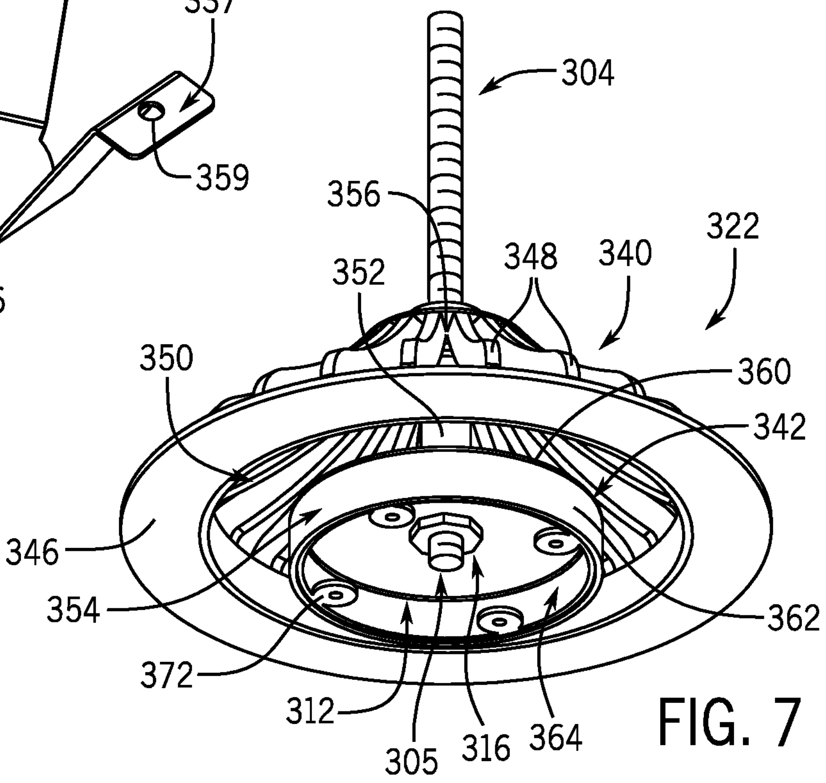
FIG. 7 is a perspective view of a coupler-baffle-junction connector sub-assembly of the connector assembly.

The connector assembly 300 further includes a baffle 322 positioned in the inlet opening 108 of the main housing 102 as shown in FIG. 3. A lower extent of the baffle 322 extends through the aperture 12*a* formed in the ceiling 12. The baffle 322 includes at least one opening 324 to permit the passage of air through both the baffle 322 and the inlet opening 108 during operation of the system 10. Referring to FIGS. 4, 5 and 7, the baffle 322 receives an extent of the elongated coupler 304 that extends through the baffle 322. The baffle 322 can be formed from a polymer material such as polypropylene or polyurethane to provide the baffle 322 with high strength and durability over time.

The connector assembly 300 also includes a junction connector assembly 312 affixed to the lower extent 305 of the elongated coupler 304. The junction connector assembly 312 includes a central passageway 314 (see FIG. 4) that receives the elongated coupler 304. Like the mounting bracket 302, the elongated coupler 304 is threadingly engaged with a retainer element 316, such as a securing nut or pin, to couple the junction connector assembly 312 to the lower coupler extent 305. While the retainer 316 is shown as a separate component, the retainer 316 can be integrally formed with the junction connector assembly 312.

The connector assembly 300 further includes a canopy 318 coupled to the junction connector assembly 312 as shown in FIGS. 1, 3 and 4. The canopy 318 is offset or spaced apart from the ceiling 12 of the room of the building structure to provide the cavity 320 between the ceiling 12 and the canopy 318. The canopy 318 improves the aesthetic appearance of the system 10 by substantially obscuring the rest of the connector assembly 300 in the installed position P1. The canopy 318 also provides a uniform securement interface between the light fixture 204 and the ceiling 12, which increases the utility of the system 10. The cavity 320 allows for the passage of air around the light fixture 204 and/or the canopy 318 and into the inlet opening 108 for ventilation of a room during operation of the blower 106 of the system 10. The system 10 includes at least one canopy 318, however, the system 10 can include multiple different sized canopies 318 (e.g., canopies with a 4 inch, 6 inch, 12 inch or 15 inch diameter) to accommodate different sized light fixtures 204, which increases the utility of the system 10.

Figure 13:
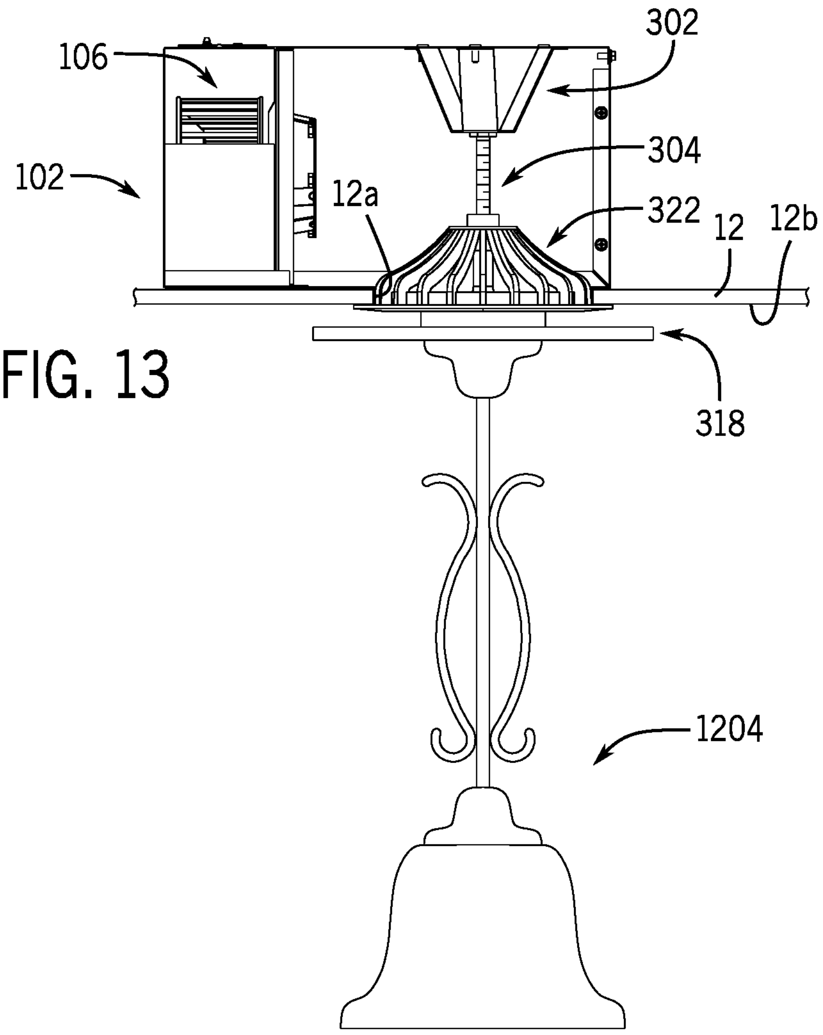
FIG. 13 is a side view of the ventilation and illumination system in an installed position where an air flow cavity is defined between a pendant-style light fixture and the ceiling.
Figure 14:
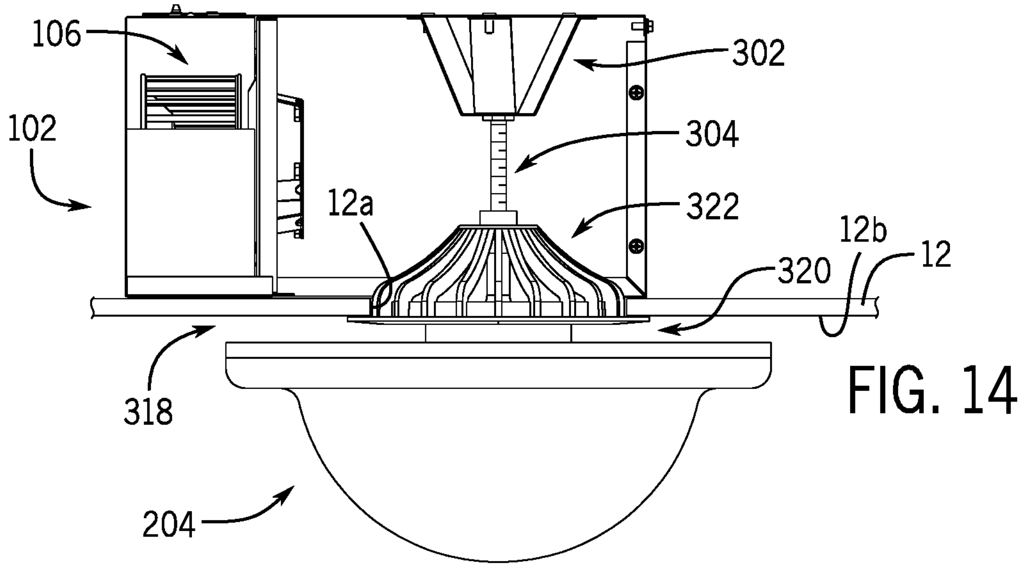
FIG. 14 is a side view of the ventilation and illumination system in an installed position where an air flow cavity is defined between the light fixture and the ceiling, where the light fixture has an outermost dimension equal to an outermost dimension of the canopy.

FIGS. 3 and 4 show the system 10 in a partially installed state, where the light fixture assembly 200 is not yet connected, whereas FIGS. 1, 13 and 14 show the system 10 in the installed position P1. In these positional states, the baffle 322 and the canopy 318 define a first critical distance 326 measured between a lower extent 328 of the baffle 322 and an upper extent 330 of the canopy 318. The structural interaction between the elongated coupler 304, the retainer element 316, the baffle 322 and the junction connector 312 provides the first critical distance 326 between the baffle 322 and the canopy 318. A second critical distance 332 is defined between a lower surface 12*b* of the ceiling 12 and the upper extent of the canopy 318. The first and second critical distances 326, 332 provide a vertical dimension of the cavity 320, at their respective locations.

The first critical distance 326 is predetermined, for instance by the engineer, developer or manufacturer of the system 10, according to the system's operating parameters, namely the blower 106, to ensure an adequate flow rate of air into the main housing 102 and to provide acceptable sound or loudness levels during operation of the system 10. In the illustrative embodiment, the blower 106 is configured to provide a flowrate of about 70 cubic feet per minute (CFM) and a sound or loudness level of about 1.5 Sones. Based upon those specifications, the first critical distance 326 is determined to be about ⅝ inch. Alternatively, the first critical distance 326 is approximately 1 inch or less, and may be within a range of ¼ to 1 inch. Usage of the connector assembly 300 ensures that the required first critical distance 326 and the cavity 320 occur in the installed position P1 whereby a sufficient amount of air is drawn through the cavity 320 and into the housing 102 during operation of the system 10. In the event the first critical distance 326 is reduced below the predetermined amount, then the cavity 320 is too restrictive and as a result, an insufficient amount of air is drawn through the cavity 320 and into the housing 102, which can reduce the operating performance (e.g., reduced air flow F, vibration and/or noise) and efficiency of the blower assembly 107. In the embodiment shown in these Figures, the second critical distance 332 is slightly larger than the first critical distance 326, due to the vertical offset between the baffle 322 and the ceiling 12.

Figure 9A:
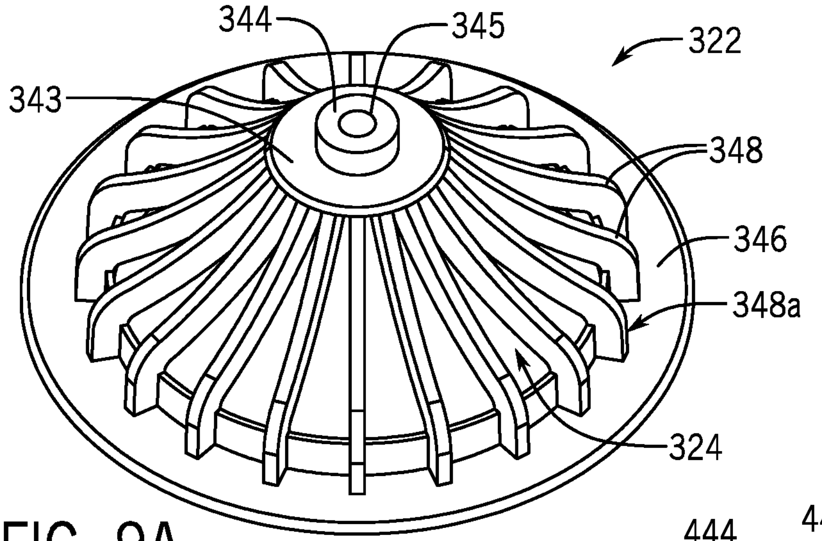
FIG. 9A is a perspective view of the baffle of the connector assembly.

FIG. 7 shows a sub-assembly formed from the coupling of the elongated coupler 304, the baffle 322, and the junction connector 312. As shown in FIGS. 7 and 9A, the baffle 322 includes a main body portion 340 that is frustro-conical shaped. The main body portion 340 includes an upper wall 343, a hub 344 extending upward from the upper wall 343 with an opening 345 that receives the elongated coupler 304, a lower flange 346 that extends circumferentially around the baffle 322, and a plurality of vanes 348 that extend between the upper wall 343 and the flange 346. The vanes 348 define at least one air passageway opening 324. The plurality of vanes 348 extend from the lower flange 346 and converge at the upper wall 343 and the hub 344 to define a recessed cavity 350 within the vanes 348. The lower flange 346 extends radially outward from a base region 348*a* of the vanes 348. Referring to FIG. 4, the base region 348*a* of the vane 348 is received within both the inlet opening 108 of the main housing 102 and the aperture 12*a* formed in the ceiling 12. Also, the flange 346 engages a lower surface 12*b* of the ceiling 12. The engagement between the baffle 322 and the ceiling 12 stabilizes the connector assembly 300—namely, the combination of the elongated coupler 304, the baffle 322, the junction connector 312 and the canopy 318—during operation of the system 10, which helps minimizes unwanted vibrations during operation that could produce undesirable operating noise and/or reduce the operating life of the system 10.

Figure 9B:
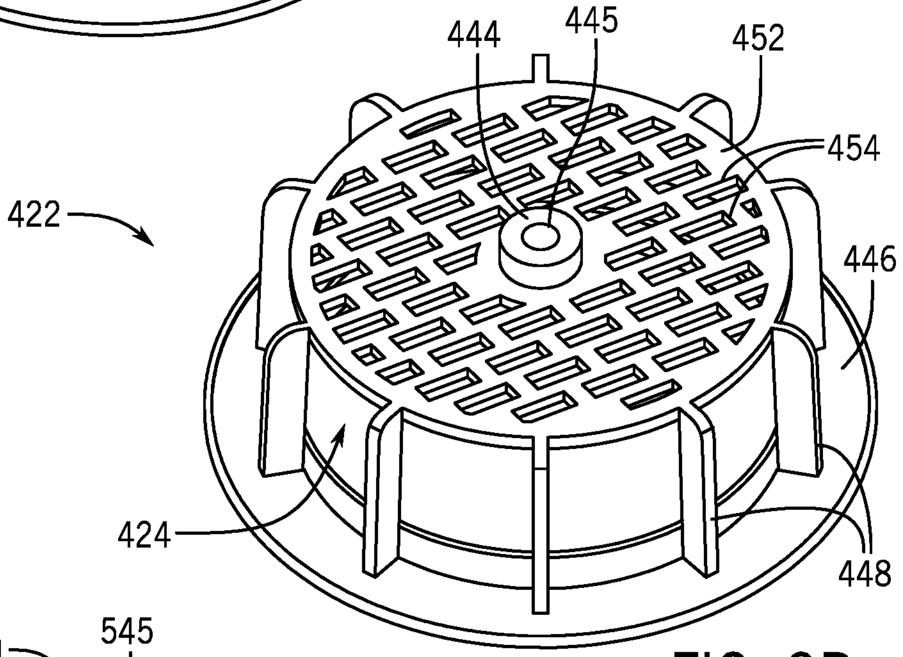
FIG. 9B is a perspective view of another embodiment of a baffle of the connector assembly.
Figure 9C:
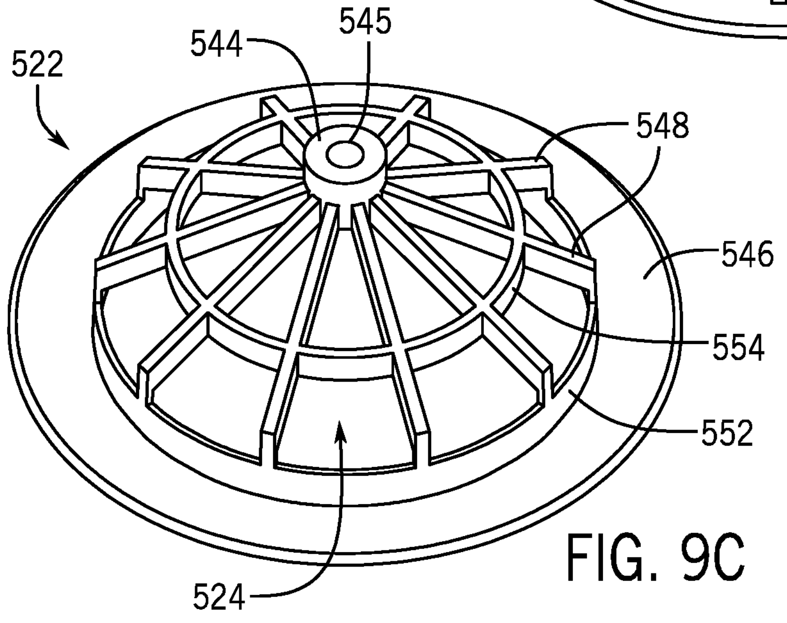
FIG. 9C is a perspective view of another embodiment of a baffle of the connector assembly.

FIGS. 9A-9C illustrate various embodiments of baffles 322, 422, 522 for use in the connector assembly 300, according to the present invention, where like numerals represent like elements of the baffles 322, 422 (see FIG. 9B), 522 (see FIG. 9C). Accordingly, reference is made to the description above for baffle 322 for a more complete description of the features and elements of the baffles 422 and 522. As shown in FIG. 9B, the baffle 422 has a side wall 424 extending between a peripheral flange 446 and an upper wall 452, a central hub 444 extending from the upper wall 452, and a plurality of ribs 448 extending along the side wall 424. The upper wall 452 includes at least one air passageway opening 424 formed therein. The central hub 444 includes an opening 445 that receives an extent of the elongated coupler 304. The side wall 424 defines an internal region that receives the junction connector 312. The flange 446 engages the lower surface 12*b* of the ceiling 12 while the ribs 448 engage the depending flange 114 of the bottom wall 112 of the housing 102 to stabilize the connector assembly 300 during operation of the system 10.

As shown in FIG. 9C, the baffle 522 includes a central hub 544, a peripheral flange 546, an intermediate side wall 552 extending from the flange 546 and a plurality of vanes 548 extending between the side wall 552 and the central hub 544. The vanes 548 define at least one air passageway opening 524 between a pair of neighboring vanes 548. An intermediate circular ring 554 extends between the vanes 548. The hub 544 includes an opening 545 that receives an extent of the elongated coupler 304. The side wall 552 and the vanes 548 define an internal region that receives the junction connector 312. The flange 546 engages the lower surface 12*b* of the ceiling 12 while the side wall 552 engage the depending flange 114 of the bottom wall 112 of the housing 102 to stabilize the connector assembly 300 during operation of the system 10.

Referring to FIGS. 4, 5 and 7, the junction connector assembly 312 includes a lower junction component or seat 341 and an upper junction component or cap 342 that overlies the lower junction component 341. In other embodiments, the lower junction component 341 and the upper junction component 342 may be integrally formed as a single component. The lower junction component 341 and the upper junction component 342 collectively provide a sub-housing or enclosure for lead wires that extend through the coupler 304 and that electrically connect with the light fixture assembly 200. Also, the upper junction component 342 is configured to help locate the baffle 322 relative to the main housing 102 and the ceiling aperture 12*a* during the installation process. The upper junction component 342 is at least partially located in the recessed cavity 350 of the baffle 322. The upper junction component 342 includes a stem 352 that extends from a base 354 of the junction component 342, as shown in FIGS. 4 and 7. Preferably, the stem 352 is hollow and adapted to receive a portion of the elongated coupler 304 (and the wire leads therein). The stem 352 includes both an upper end 356 that engages the hub 344 of the main body portion 340 of the baffle 322, and a lower end 358 coupled to the base 354 such that the base 354 is spaced apart from the hub 344. In this manner, the upper junction component 342 helps to locate the baffle 322 by biasing the baffle 322 upwardly into the inlet opening 108 and the lower baffle flange 346 into engagement with the ceiling 12. The base 354 includes an upper plate 360 that extends outwardly away from the stem 352 and a depending flange 362 that extends downwardly from an edge of the plate 360 to define a cavity 364 inward from the depending flange 362. The lower junction component 341 is received within the cavity 364 and held in place by the retainer 316 as described above. The lower junction component 341 includes a plurality of internal mounting apertures 372 arranged within the cavity 364. As detailed below, the lower junction component 341 is coupled to the canopy 318 to secure it to the other components of the connector assembly 300.

Figure 8:
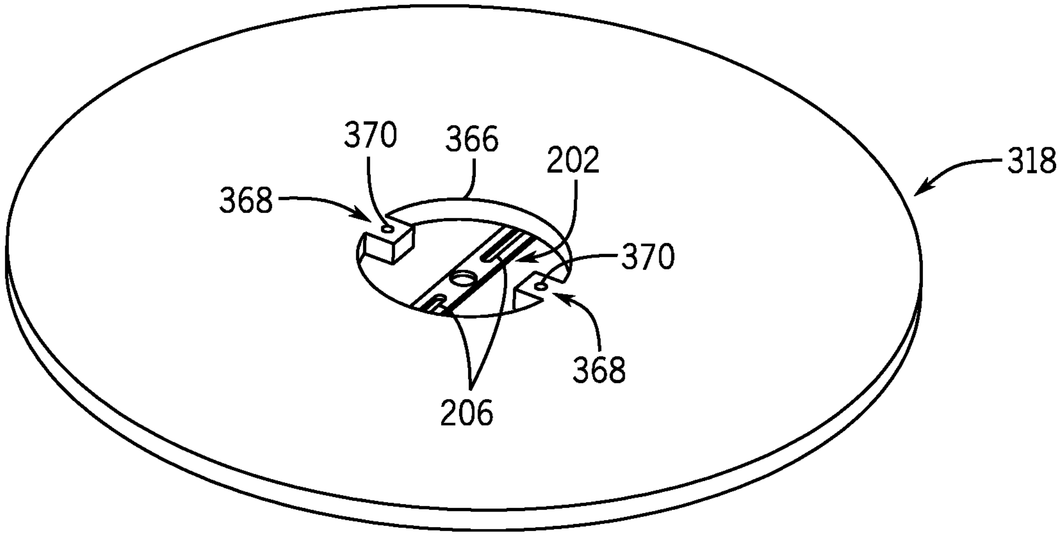
FIG. 8 is a perspective view of a canopy of the connector assembly.

As shown in FIGS. 5 and 8, the canopy 318 is illustratively configured as a substantially flat, plate-like member with a central opening 366. The canopy 318 includes a plurality of projections 368 that extend inward from the periphery of the opening 366. The projections 368 include mounting apertures 370 that are configured to receive fasteners 371 to couple the canopy 318 to the junction connector assembly 312. The fasteners extend through the apertures 370 and into complementary mounting apertures 372 formed in the junction connector 312. In the installed position P1 of FIG. 1, the canopy 318 substantially obscures the sightline to the baffle 322 and the inlet opening 108 to improve the aesthetic appearance for the light fixture assembly 200 and the connector assembly 300. In other words, the arrangement of the baffle 322 and the canopy 318 prevents a person located in the room in which the system 10 is installed from having a line of sight past the baffle 322 and into the opening 108 of the housing 102.

The process of installing the system 10 in a support surface, such as the ceiling 12, is now described with reference to the various installation stages of FIGS. 10-12. In general, an installer of the system 10, such as an electrician, carpenter or homebuilder, can adjust the connector assembly 300 to attain both the first critical distance 326 between the baffle 322 and the canopy 318 and the cavity 320 while accommodating structural variances in the room or ceiling in which the system 10 is installed and that arise from the construction of the room or the overall building structure. The installer's adjustment of the connector assembly 300 to satisfy the first critical distance 326 and attain the cavity 320 ensures sufficient air flow F, which then facilitates the operating performance of the system 10 and its long term durability. The primary installation steps of the system 10 are shown in FIGS. 10-12, which include a series of side views with a side wall of the housing 102 removed to illustrate the installation steps.

Figure 10:
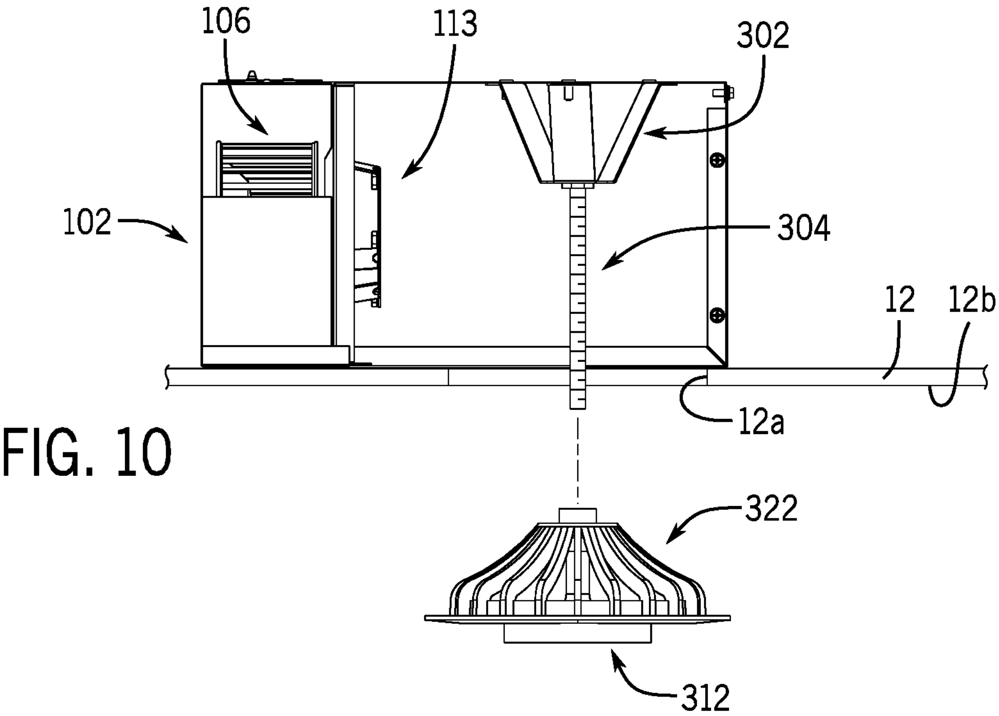
FIG. 10 is a side view of the ventilation and illumination system showing the connector assembly in a first partially installed state.

Referring to FIG. 10, the ventilation assembly 100 is mounted between support beams of a ceiling 12 and aligned with an opening 12*a* formed in the ceiling 12. In the event the ceiling 12 has not yet been installed during the construction of the room, the ventilation assembly 100 can still be installed to the support beams extending above the room including the eventual ceiling 12. During installation of the ceiling 12, the opening 12*a* is formed adjacent to the inlet opening 108 such that the depending flange 114 is received in the opening 12*a* in the ceiling 12. The elongated coupler 304 is pre-assembled by the manufacturer of the system 10 such that the coupler 304 extends downward from the mounting bracket and a pre-defined amount of the lower extent 305 of the elongated coupler 304 extends through the inlet opening 108 and past the opening 12*b* in the ceiling 12 into the room. In the event that they are not pre-assembled, the elongated coupler 304 is inserted into the mounting bracket 302 such that the pre-defined amount of the lower coupler extent 305 extends through the inlet opening 108 and past the ceiling opening 12*b* into the room 9. The elongated coupler 304 may be rotated about its axis 304*a* to adjust the elongated coupler 304 relative to the mounting bracket 302 whereby a greater or lesser amount of the upper extent 308 of the coupler 304 is brought closer to or further from the upper wall 111 of the main housing 102. The baffle 322 and the junction connector assembly 312 are then readied for installation.

Figure 11:
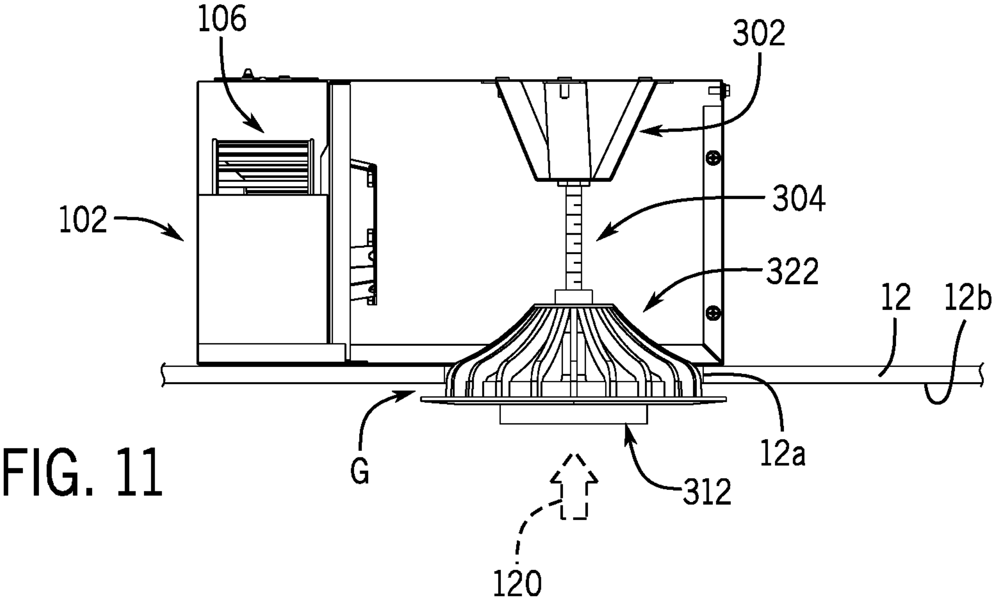
FIG. 11 is a side view of the ventilation and illumination system showing the connector assembly in a second partially installed state.

As shown in the partially installed state of FIG. 11, the baffle 322 and the junction connector assembly 312 are initially displaced along the lower coupler extent 305 by the installer's application of an upwardly directed connection force, denoted by the upward arrow 120. While the coupler 304 is shown as having external threads (see FIGS. 5 and 7), the hub 344 of the baffle 322 and the lower junction component 341 and the upper junction component 342 of the junction connector assembly 312 lack internal threads, wherein the baffle 322 and the junction connector assembly 312 can be slid upwardly along the coupler 304 by application of the connection force 120 that lacks a rotational component. Alternatively, the hub 344, the lower junction component 341, and/or the upper junction component 342 include internal threads, wherein one or more of these parts are displaced upward along the coupler 304 by application of a combined upwardly directed and rotational force 120. After the installer initially moves the baffle 322 and the junction connector assembly 312 upward a sufficient amount on the coupler 304, the installer actuates the retainer 316 on the lower coupler extent 305—for example, by rotating the retainer 316—to reduce a gap G (defined between the lower flange 346 and the ceiling surface 12*b*). The actuation of the retainer 316 secures the junction connector assembly 312 and the baffle 322 to the lower coupler extent 305 and biases the baffle 322 upward until the flange 346 of the baffle 322 engages the lower surface 12*b* of the ceiling 12. In this manner, the baffle 322 and the junction connector assembly 312 are indexed, through the application of the connection force 120 and actuation of the retainer 316, along the lower coupler extent 305 relative to the lower surface 12*b* of the ceiling 12. When the flange 346 of the baffle 322 engages the lower ceiling surface 12*b*, the gap G is eliminated to arrive at the partially installed state of FIG. 12 (and generally depicted in FIG. 4), and the installer does not need to further actuate the retainer 316. In the partially installed state and the installed position P1 (of FIGS. 1 and 13), the lower end 305 of the coupler 304 and the retainer 316 reside within the lower junction component 341 and the cavity 364 of the upper junction component 342.

Referring to the partially installed state of FIG. 12, the installer moves the canopy 318 upward, as denoted by the connection force arrow 120, and into engagement with the junction connector 312 where at least one fastener 371 such as a threaded screw, couples the canopy 318 to the junction connector assembly 312. Specifically, the installer inserts the fastener 371 through the opening 370 in the canopy 318 for securement to the lower junction component 341 to reach the partially installed state. At this juncture, the wire leads that extend from the power source through the elongated coupler 304 can be mechanically and electrically connected to the light fixture assembly 200 to supply power to the light fixture 204 during operation. As shown in the installed position P1 of FIGS. 1 and 13, the canopy 318 is coupled to the connector assembly 300 and the light fixture 204 is also coupled to the lower surface 318*a* of the canopy 318. In the installed position P1 and as shown in FIG. 4, the upper plate 360 resides slightly above the lower baffle extent 328, a substantial extent of the depending flange 362 resides below the lower baffle extent 328, and a substantial extent of the lower junction component 341 resides below the lower baffle extent 328, wherein this relative positioning helps to offset the canopy 318 and define the cavity 320.

As mentioned above, the light fixture assembly 200 includes a light fixture bracket 202 and a light fixture 204. Referring again to FIGS. 7 and 8 in conjunction with FIG. 12, the light fixture bracket 202 includes a pair of slots 206 that are configured to receive fasteners (not shown) to mount the light fixture 204 to the lower component 341 of the junction connector 312. Specifically, the installer inserts a fastener, such as a threaded screw, through each of the bracket slots 206 and into the mounting apertures 372 formed in the lower connector component 341. The light fixture 204 may then be mounted to the fixture bracket 202 to reach the installed position P1. Illustratively, the light fixture bracket 204 is arranged generally perpendicular to the projections 368 of the canopy 318 so that the installer may mount both the canopy 318 and the fixture bracket 204 to the lower junction component 341 using respective mounting apertures 372.

In the installed position P1 of FIGS. 1, 13 and 14, the canopy 318 is offset from the baffle 322 by the first critical distance 326 to provide the air flow cavity 320 between the light fixture 204 and the ceiling 12. As mentioned above, the air flow cavity 320 allows for air flow F around the light fixture 204, through the baffle 322 and into the ventilation assembly 100 for eventual exhaust beyond the room in which the system 10 is installed. The upper boundary of the cavity 320 is defined by a lower surface 12*b* of the ceiling 12 and the lower boundary is defined by an upper surface of a baffle 322 of the connector assembly 300. The outermost dimension and peripheral boundary of the cavity 320 are defined by the periphery or outermost dimension of the canopy 318. In the illustrated embodiment, the peripheral boundary of the cavity 320 and the outermost dimension of the canopy 318 exceed the outermost dimension or periphery of the baffle 322. As shown in FIGS. 1 and 12, the light fixture 204 has a circular upper flange 205, causing the cavity 320 to have a circular peripheral boundary. The first critical distance 326 and the second critical distance 332 represent vertical dimensions of the cavity 320, and they are purposely designed to provide sufficient operational air flow F, sound levels, and aesthetic appearances for the ventilation and illumination system 10.

As suggested in FIGS. 12-14, the light fixture 204 may include a number of different styles and/or dimensions. For example, the light fixture 204 may include a flush or semi-flush ceiling mount light fixture or a pendant light fixture 1204 (see FIG. 13). While the system 10 may include different sized canopies 318 in the packaging, the installer can select a particular size of the canopy 318 based on the type of light fixture 204 used with the system 10. For example, when a flush or semi-flush mount light fixture is used, the canopy 318 may have a relatively large outermost dimension that may be greater than an outermost dimension of a fixture interface region of the light fixture 204, as shown in FIG. 12, or may be equal to an outermost dimension of the light fixture 204 as shown in FIG. 14. When a pendant light fixture 1204 is used, as shown in FIG. 13, the canopy 318 may include an outermost dimension that is larger than the outermost dimension of the pendant light fixture 1204, yet relatively smaller than the outermost dimension used with a flush mount light fixture as shown in FIG. 14. In any configuration, the canopy 318 is configured to provide a subtle and uniform visual transition from the light fixture 204 while at least substantially obscuring, and preferably totally obscuring, the aperture 12*a* formed in the ceiling 12 and the baffle 322 from view by a person located in the room in which the system 10 is installed. In this manner and as mentioned above, the system 10 can include multiple different sized canopies 318 (e.g., canopies with 4 inch, 6 inch, 12 inch or 15 inch diameters) to be selected by the installer to accommodate the mechanical and electrical connection of different sized light fixtures 204, which increases the utility of the system 10.

Figure 15:
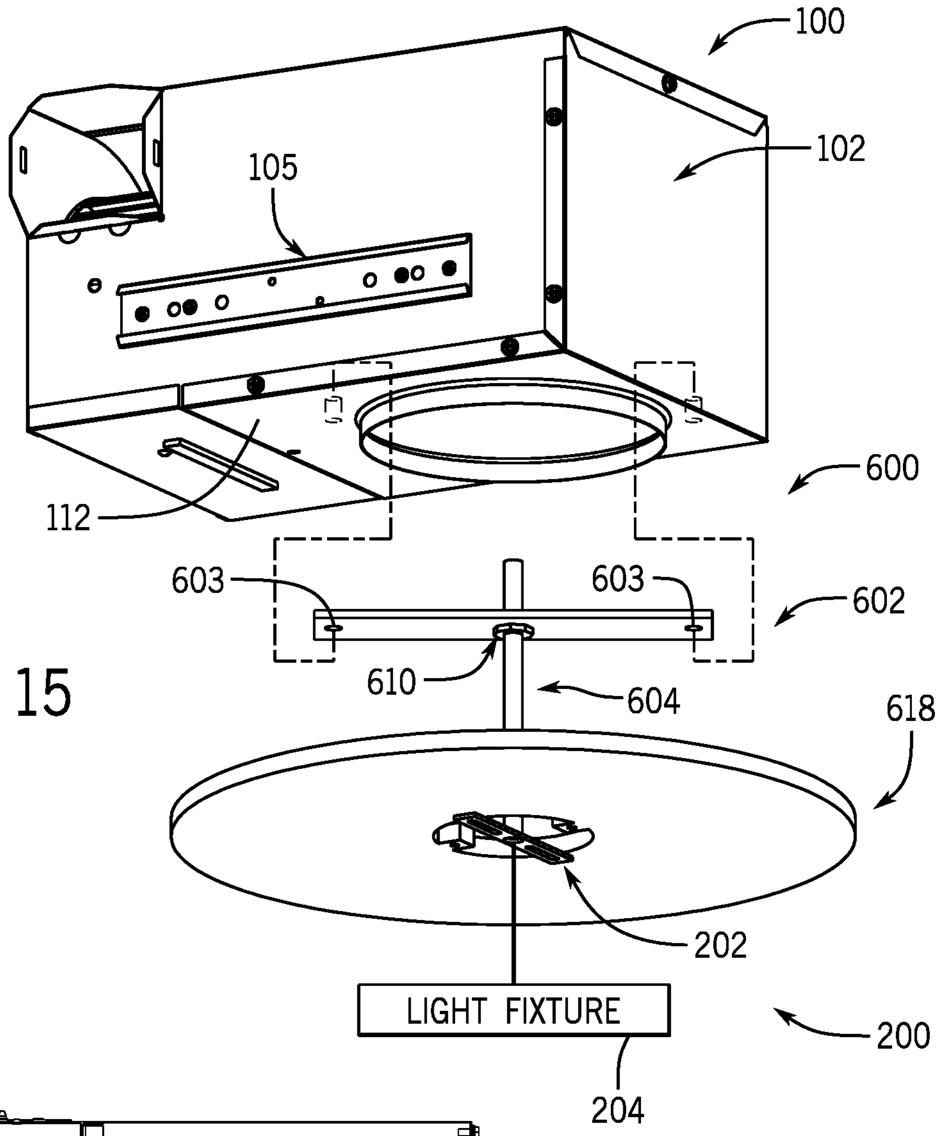
FIG. 15 is a perspective view of a second embodiment of combined ventilation and illumination system showing an alternate connector assembly detached from a ventilation assembly.
Figure 16:
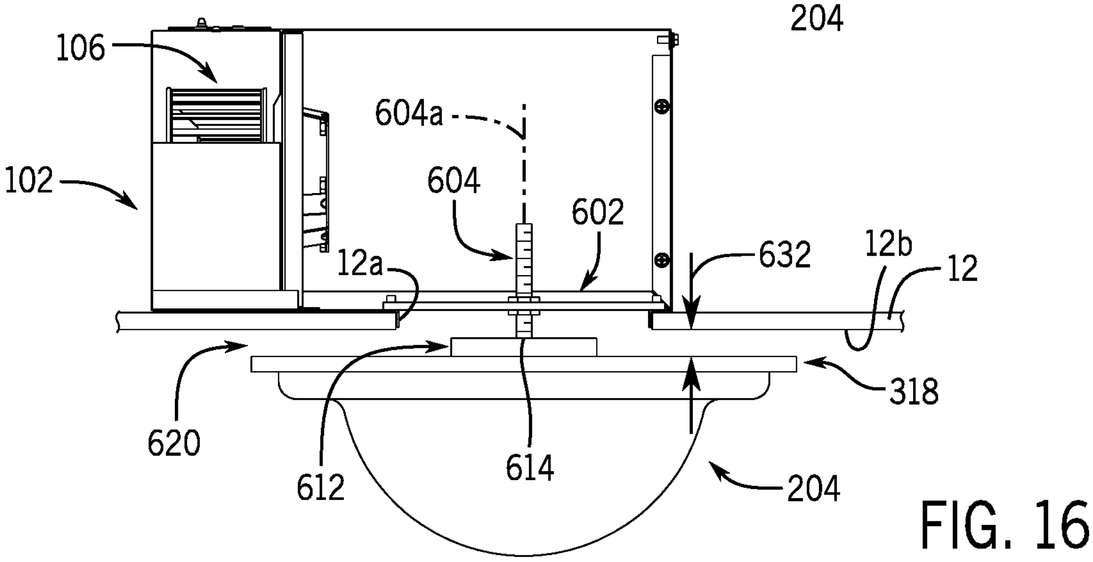
FIG. 16 is a side view of the ventilation and illumination system of FIG. 16 in an installed position where an air flow cavity is defined between the light fixture and the ceiling to which the system is installed.

FIGS. 15 and 16 illustrate another ventilation and illumination system 10 including an alternate connector assembly 600 according to the present invention, wherein like numerals represent like elements of the system 10. The connector assembly 600 shares many of the same elements and features described above with reference to the illustrated embodiment of connector assembly 300 of FIGS. 1-14, however, the connector assembly 600 includes a mounting bracket 602 and an elongated coupler 604.

Referring to FIGS. 15 and 16, the mounting bracket 602 is secured to the bottom wall 112 of the main housing 102 above the inlet opening 108 to align the connector assembly 600 and the light fixture assembly 200 with the inlet opening 108 along an axis 604*a*. As configured, the mounting bracket 302 spans and extends across the inlet opening 108. The elongated coupler 604 extends through and is adjustably coupled to the mounting bracket 602 via a retainer 610, wherein the coupler 604 extends downwardly from the mounting bracket 602 and at least partially through the inlet opening 108.

The mounting bracket 602 is embodied as a rectangular plate having a length that is greater than the diameter of the inlet opening 108. The mounting bracket 602 includes at least one aperture 603 configured to receive a fastener or weld stud located on the bottom wall 112 of the main housing 102. The mounting bracket 602 is arranged to extend across the inlet opening 108 and couple to the bottom wall 112 of the main housing 102 to fix the connector assembly 600 relative to the ventilation assembly 100. As shown in FIG. 15, the connector assembly 600 further includes a junction connector assembly 612 joined to the elongated coupler 604 opposite the mounting bracket 602 and the canopy 318 coupled to the junction connector assembly 612. Usage of the connector assembly 600 to secure the canopy 318 provides the air flow cavity 320 between the ceiling 12 and the canopy 318.

Referring to FIG. 16, the cavity 320 includes a critical distance 632 between the canopy 318 and the ceiling that is sized to accommodate operating parameters of the blower assembly 106 installed within the housing 102. Although not shown in FIGS. 15 and 16, the connector assembly 600 may further include a baffle arranged in the inlet opening 108, wherein the baffle include a recess or groove to accommodate the mounting bracket 602.

While preferred embodiments have been described above and illustrated in the accompanying drawings, it will be evident to those skilled in the art that modifications may be made without departing from this disclosure. Such modifications are considered as possible variants comprised in the scope of the disclosure. Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The use of the terms "a" and "an" and "the" and "said" and similar references in the context of describing the invention (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A ventilation and illumination system installable within a ceiling of a building structure, the ventilation and illumination system comprising:

- a ventilation assembly including (i) a main housing with an external wall arrangement defining an internal region, (ii) an inlet opening formed in an external wall, (iii) an outlet opening formed in an external wall and configured to exhaust air from the main housing, and (iv) a blower residing within the internal region and configured to generate air flow through the inlet opening and into the main housing;
- a light fixture assembly including (i) a fixture, and (ii) a lighting element; and,
- a connector assembly that operably connects the light fixture assembly to the ventilation assembly, the connector assembly including (i) a mounting bracket secured to the main housing and cooperatively aligned with the inlet opening, (ii) an elongated coupler extending from the mounting bracket through the inlet opening, (iii) a baffle positioned within the inlet opening and receiving an extent of the elongated coupler, wherein the baffle has at least one opening that allows for the passage of air through the baffle and the inlet opening, (iv) a junction connector affixed to a lower extent of the elongated coupler, and (v) a canopy coupled to both the junction connector and the light fixture assembly to define an installed position;

wherein in the installed position, the canopy is offset a first critical distance from a lower extent of the baffle to define an air flow cavity that allows for air flow around the canopy, through the baffle and into the internal region of the main housing.

2. The ventilation and illumination system of claim 1, wherein the first critical distance is sized according to operating parameters of the blower of the ventilation assembly to provide a sufficient flow rate of intake air and acceptable sound levels during operation of the ventilation and illumination system.

3. The ventilation and illumination system of claim 1, wherein the first critical distance is less than 1 inch.

4. The ventilation and illumination system of claim 1, wherein the first critical distance is ⅝ inch.

5. The ventilation and illumination system of claim 1, wherein the first critical distance is between ¼ and 1 inch.

6. The ventilation and illumination system of claim 1, wherein the canopy has an outermost dimension that exceeds an outermost dimension of the baffle, wherein the canopy substantially obscures the baffle in the installed position.

7. The ventilation and illumination system of claim 1, wherein the canopy has an outermost dimension that exceeds an outermost dimension of the fixture at a fixture interface region with the canopy.

8. The ventilation and illumination system of claim 1, wherein in the installed position, the canopy is offset a second critical distance from a lower surface of the ceiling to further define the air flow cavity that allows for air flow around the canopy, through the baffle and into the internal region of the main housing.

9. The ventilation and illumination system of claim 8, wherein the second critical distance exceeds the first critical distance.

10. The ventilation and illumination system of claim 1, wherein the baffle has a lower peripheral flange that engages a lower surface of the ceiling in the installed position.

11. The ventilation and illumination system of claim 1, wherein the mounting bracket is affixed to an upper wall of the main housing, and an upper portion of the elongated coupler extends through an aperture formed in the mounting bracket.

12. The ventilation and illumination system of claim 1, wherein the elongated coupler is adjustable relative to the bracket whereby a greater or lesser amount of an upper portion of the elongated coupler can be brought closer to or further from an upper wall of the main housing.

13. The ventilation and illumination system of claim 1, wherein a plurality of wire leads extend from a power source through the elongated coupler to the light fixture assembly to supply power to the lighting element.

14. A ventilation and illumination system installable within a ceiling of a room in a building structure, the ventilation and illumination system comprising:

a ventilation assembly including (i) a main housing with a wall arrangement defining an internal region, (ii) an inlet opening formed in a lower wall of the housing, (iii) an outlet opening formed in an one of either a side wall or top wall of the housing, the outlet opening configured to exhaust air from the main housing, and (iv) a blower residing within the internal region and configured to generate air flow through the inlet opening and into the main housing;

a light fixture assembly including (i) a fixture, and (ii) a lighting element; and, a connector assembly that operably connects the light fixture assembly to the ventilation assembly, the connector assembly including (i) a mounting bracket secured to the main housing, (ii) an elongated coupler extending from the mounting bracket through the inlet opening, (iii) a baffle positioned cooperatively positioned with the inlet opening and receiving an extent of the elongated coupler, wherein the baffle allows for the passage of air through the inlet opening, (iv) a junction connector affixed to a lower extent of the elongated coupler, and (v) a canopy;

wherein in an installed position, the canopy is (i) coupled to the junction connector and the light fixture assembly, and (ii) offset a first critical distance from a lower extent of the baffle to define an air flow cavity that allows for air flow around the canopy, through the baffle and into the internal region of the main housing during operation of the blower.

15. The ventilation and illumination system of claim 14, wherein the first critical distance is sized according to operating parameters of the blower of the ventilation assembly to provide a sufficient flow rate of intake air and acceptable sound levels during operation of the ventilation and illumination system.

16. The ventilation and illumination system of claim 14, wherein the first critical distance is approximately 1 inch.

17. The ventilation and illumination system of claim 14, wherein the first critical distance is between ¼ and 1 inch.

18. The ventilation and illumination system of claim 14, wherein the canopy has an outermost dimension that exceeds an outermost dimension of the baffle, wherein the canopy substantially obscures the baffle in the installed position.

19. The ventilation and illumination system of claim 14, wherein the canopy has an outermost dimension that exceeds an outermost dimension of the fixture at a fixture interface region with the canopy.

20. The ventilation and illumination system of claim 14, wherein in the installed position, the canopy is offset a second critical distance from a lower surface of the ceiling to further define the air flow cavity that allows for air flow around the canopy, through the baffle and into the internal region of the main housing.

21. The ventilation and illumination system of claim 20, wherein the second critical distance exceeds the first critical distance.

22. The ventilation and illumination system of claim 14, wherein the inlet opening is formed in a bottom wall of the main housing, the bottom wall having a depending flange and the baffle residing radially inward of the depending flange in the installed position.

23. The ventilation and illumination system of claim 14, wherein the inlet opening is formed in a bottom wall of the main housing, the bottom wall having a depending flange residing radially inward of an aperture formed in the ceiling in the installed position.

* * * * *